United States Patent
Hammarberg et al.

(10) Patent No.: US 9,259,674 B2
(45) Date of Patent: Feb. 16, 2016

(54) METHOD AND APPARATUS FOR REDUCING THE THICKNESS OF A PRECOAT LAYER OF A DISC FILTER

(71) Applicant: Andritz OY, Helsinki (FI)

(72) Inventors: Tommi Hammarberg, Joutseno (FI); Matti Mantsinen, Kotka (FI); Simo Suutari, Summa (FI); Petri Tarjavuori, Lappeenranta (FI)

(73) Assignee: Andritz Oy, Helsinki (FI)

( * ) Notice: Subject to any disclaimer, the term of this patent is extended or adjusted under 35 U.S.C. 154(b) by 1 day.

(21) Appl. No.: 14/377,065

(22) PCT Filed: Feb. 5, 2013

(86) PCT No.: PCT/FI2013/050126
§ 371 (c)(1),
(2) Date: Aug. 6, 2014

(87) PCT Pub. No.: WO2013/117813
PCT Pub. Date: Aug. 15, 2013

(65) Prior Publication Data
US 2014/0374363 A1    Dec. 25, 2014

(30) Foreign Application Priority Data
Feb. 6, 2012    (FI) ...................................... 20125126

(51) Int. Cl.
*B01D 37/02*    (2006.01)
*B01D 33/15*    (2006.01)
*B01D 33/21*    (2006.01)
*B01D 33/46*    (2006.01)

(52) U.S. Cl.
CPC .............. *B01D 33/466* (2013.01); *B01D 33/21* (2013.01)

(58) Field of Classification Search
None
See application file for complete search history.

(56) References Cited

U.S. PATENT DOCUMENTS

| 4,695,381 | A | * | 9/1987 | Ragnegard | ............. | B01D 33/23 |
| | | | | | | 210/403 |
| 4,929,355 | A | * | 5/1990 | Ragneg.ang.rd | ....... | B01D 33/09 |
| | | | | | | 162/29 |

(Continued)

FOREIGN PATENT DOCUMENTS

| DE | 38 14 373 A1 | 11/1989 |
| WO | 2006/056649 A1 | 6/2006 |

(Continued)

OTHER PUBLICATIONS

Written Opinion and International Search Report re International Patent Application No. PCT/FI2013/050126, 6 pages, dated May 17, 2013.

*Primary Examiner* — Robert James Popovics
(74) *Attorney, Agent, or Firm* — Nixon & Vanderhye P.C.

(57) ABSTRACT

Method and apparatus for reducing the thickness of a precoat-layer accumulated on the filtering surface of a filter disc from a solids-containing suspension in a basin of a disc filter, said disc filter having two or more filter discs arranged on a shaft and between them at least one drop chute provided with a scraper on both sides, which scraper scrapes the cake filtered from the suspension on the filtering surfaces of the filter discs into the drop, the layer thickness of the precoat on the filtering surface is reduced by shortening the distance between the tips of the scrapers and the filtering surface, and the precoat thickness reduction is accomplished for the precoats on the filtering surface of the two filter discs on both sides of the drop chute non-simultaneously.

14 Claims, 3 Drawing Sheets

(56) References Cited

U.S. PATENT DOCUMENTS

Figure 1:
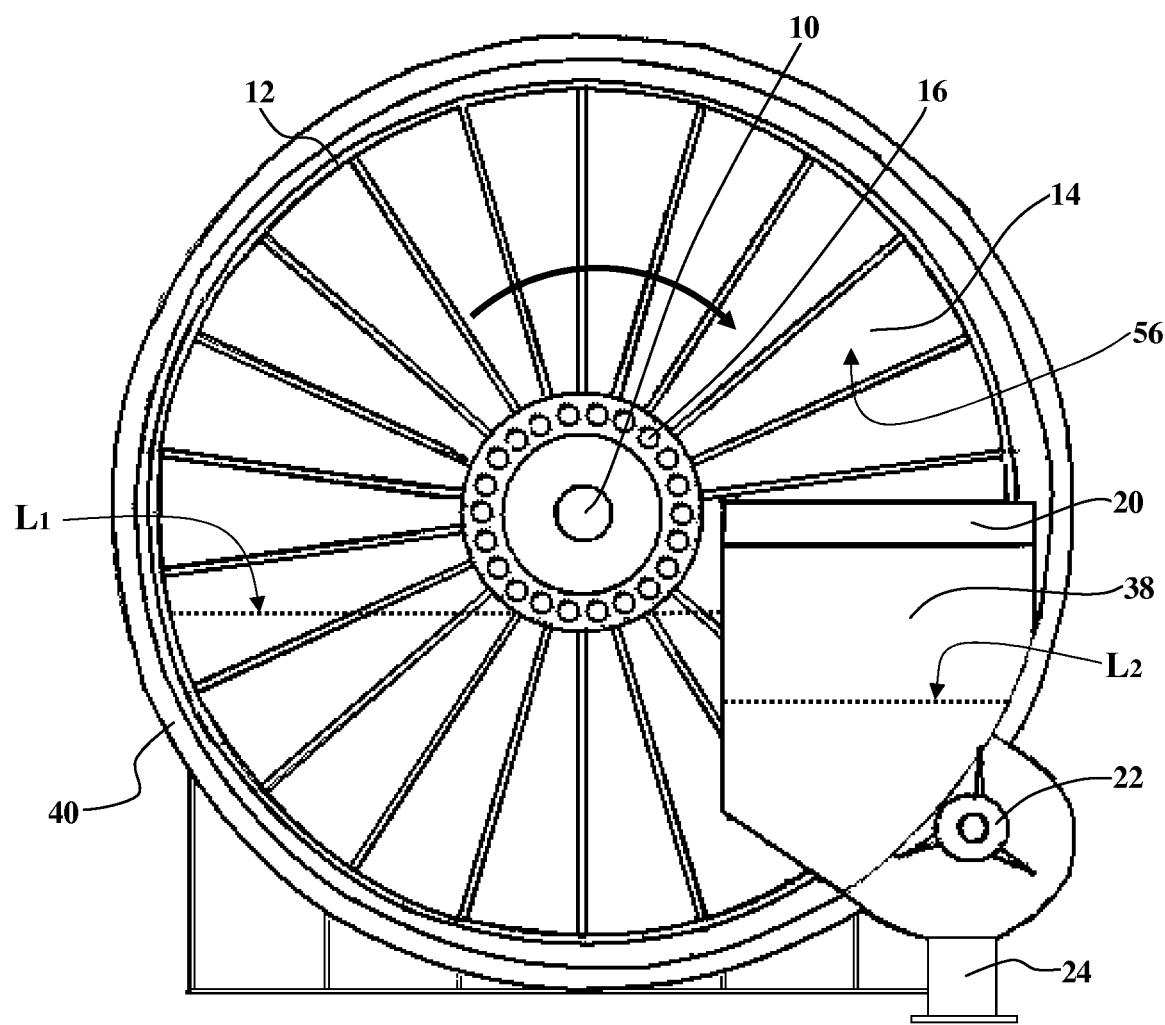

| | | | | |
|---|---|---|---|---|
| 5,124,029 A * | 6/1992 | Fjallstrom | B01D 33/15 | 209/250 |
| 5,227,064 A * | 7/1993 | Strid | B01D 33/21 | 210/327 |
| 5,540,846 A * | 7/1996 | Koch | B01D 33/21 | 134/31 |
| 5,705,068 A * | 1/1998 | Lukkarinen | B01D 33/21 | 210/331 |
| 5,707,512 A * | 1/1998 | Koch | B01D 33/21 | 210/136 |
| 5,759,397 A * | 6/1998 | Larsson | B01D 33/073 | 210/331 |
| 5,849,202 A * | 12/1998 | Koch | B01D 29/01 | 210/196 |
| 5,855,799 A * | 1/1999 | Herrmann | B01D 17/045 | 210/330 |
| 5,900,158 A * | 5/1999 | Ruokolainen | B01D 33/21 | 210/331 |
| 5,951,878 A * | 9/1999 | Astrom | B01D 33/21 | 210/197 |
| 6,063,294 A * | 5/2000 | Martensson | B01D 33/21 | 210/103 |
| 6,096,198 A * | 8/2000 | Underhill | B01D 17/0202 | 210/123 |
| 6,103,132 A * | 8/2000 | Seyfried | B01D 33/073 | 210/331 |
| 6,217,782 B1 * | 4/2001 | Tuori | B01D 29/114 | 210/331 |
| 6,258,282 B1 * | 7/2001 | Strid | B01D 33/21 | 210/331 |
| 6,284,136 B1 * | 9/2001 | Tuori | B01D 29/114 | 210/331 |
| 6,294,098 B1 * | 9/2001 | Bergmann | B01D 33/21 | 210/331 |
| 6,419,835 B1 * | 7/2002 | Virtanen | B01D 29/00 | 210/331 |
| 6,793,809 B2 * | 9/2004 | Ingelman | B01D 33/21 | 210/143 |
| 6,833,077 B2 * | 12/2004 | Flanagan | B01D 33/21 | 210/193 |
| 7,005,067 B2 * | 2/2006 | Flanagan | B01D 33/21 | 210/248 |
| 8,002,994 B2 * | 8/2011 | Engdahl | B01D 33/21 | 210/331 |
| 8,048,296 B2 * | 11/2011 | Stevens | B01D 29/39 | 210/106 |
| 8,101,090 B2 * | 1/2012 | Ralvert | B01D 33/21 | 210/138 |
| 8,444,851 B2 * | 5/2013 | Kindlund | B01D 33/21 | 162/14 |
| 8,444,862 B2 * | 5/2013 | Ralvert | B01D 33/21 | 210/138 |
| 8,852,445 B2 * | 10/2014 | Xia | B01D 29/39 | 210/333.01 |
| 2002/0166821 A1 * | 11/2002 | Flanagan | B01D 33/21 | 210/784 |
| 2002/0166822 A1 * | 11/2002 | Flanagan | B01D 33/21 | 210/784 |
| 2005/0103727 A1 * | 5/2005 | Flanagan | B01D 33/21 | 210/772 |
| 2008/0164222 A1 * | 7/2008 | Engdahl | B01D 33/21 | 210/772 |
| 2011/0000834 A1 * | 1/2011 | Kindlund | B01D 33/21 | 210/107 |
| 2014/0374363 A1 * | 12/2014 | Hammarberg | B01D 33/466 | 210/777 |

FOREIGN PATENT DOCUMENTS

| | | |
|---|---|---|
| WO | 2011/078749 A1 | 6/2011 |
| WO | 2011/159235 A1 | 12/2011 |

* cited by examiner

METHOD AND APPARATUS FOR REDUCING THE THICKNESS OF A PRECOAT LAYER OF A DISC FILTER

CROSS-REFERENCE TO RELATED APPLICATIONS

This application is the U.S. national phase of International Patent Application No. PCT/FI2013/050126 filed 2013 Feb. 5, which designated the U.S. and claims priority to FI 20125126 filed 6 Feb. 2012, the entire contents of each of which are hereby incorporated by reference.

OBJECT OF THE INVENTION

The present invention relates to disc filters comprising two or more filter discs, in which a precoat layer is used to assist in the filtration of a solids-containing suspension. The invention is especially suitable for filtering lime sludge in the chemical pulp industry.

PRIOR ART

A precoat layer is commonly used in filtering processes and it is especially advantageous in filtering white and green liquor, whereby the material to be filtered acts as the precoat layer. When the solid matter layer has accumulated to form an adequately thick cake, a scraper scrapes the filtered solid matter off from the surface of the precoat.

The same precoat layer cannot be used continuously, since it gets clogged by fines. The layer has to be periodically removed at least partly and be replaced by a new layer. The normally used technique is to automatically move the scrapers according to a certain program closer to the filtering surface for at least one revolution and to return them back, whereby a clogged surface layer can be removed. When a scraper has this way several times approached the precoat layer, the precoat layer is totally removed and a new precoat layer is accumulated.

When disc filters are used, the filtering apparatus usually comprises several, e.g. eight discs, both sides of which act as filtering surfaces. Processes performed with the discs are usually parallel, i.e. the process operations performed with them are all similar and simultaneous. Also the reduction of the precoat layer is performed so that the actuating members of the scrapers are connected to one actuator that moves the scrapers simultaneously, similarly and symmetrically towards the surface of the disc. Large filters can also have parallel actuators and actuating members.

Problems Relating to Prior Art

When the thickness of a precoat layer is reduced with a disc filter according to prior art, the result is that simultaneously the amount of filtered solid matter produced with the filter is occasionally increased remarkably, even multiplied. For instance, in filtering white liquor, a layer having a thickness of 1 mm is typically scraped off, but in the reduction of a precoat layer, the thickness of an accumulated layer being removed, including the cake, is typically approximately 3-4 mm. After the reduction, the scrapers are returned to a normal distance, and thus it takes some time before the layer thickness reaches the extent that a scraper again starts to scrape off the cake.

Temporary changes in the production rates while thinning precoat layer leads to that the design and dimensioning of the filter requires consideration, how to recover from these changes without excessive filling of the drop chute. This can cause clogging. This problem is especially emphasized when filtering lime sludge of the chemical pulp industry, which is viscous and tends to form lumps. Lime sludge, after forming layers and lumps, is not necessarily properly slurried by means of mixers and feeding slurrying liquid. Thus, the dimensions and properties of a drop chute with accessories and slurrying streams are to be adapted to maximum momentary production flow. Also the discharge pipe lines and/or a discharge conveyor with accessories are to be dimensioned for a momentary production rate and they cannot be optimized to be best suitable for normal production. In practice, this makes the apparatus excessively large and expensive, which is further emphasized by the number of discs. A further risk is production interruptions caused by clogging, which are not desired for such an important apparatus and which may cause problems for process stages taking place after the filtration.

Changes in the amount of produced solid matter can cause considerable problems for processes downstream of filtering especially, if the produced solid matter stream is not compensated e.g. by means of an intermediate storage. An example of this is the feeding of a lime sludge washing filter directly from the white liquor filter. Also when feeding a lime kiln from a lime sludge filter, changes in the production rate may have an influence on the composition and amount of the flue gas of the kiln. E.g. the content of odorous sulfur compounds easily increases as a result of these changes.

The scrapers are located in conditions where exact, smooth and slow motions are extremely difficult to perform, because e.g. corrosive and unclean conditions hinder lubrication of the moving surfaces, which may get fouled. Therefore, the thickness reduction of precoat in apparatuses with several filter discs has been performed by means of straightforward, uncontrolled motions based on extreme positions or limiters, e.g. by using a hydraulic cylinder. The conditions in e.g. lime sludge filtering, especially due to periodical removal of precoat are such that the use of moving parts in the interior of the apparatus is to be avoided as much as possible.

When the precoat thickness reduction is performed for all filtering surfaces simultaneously, the engine power required for rotating the filter discs is substantially increased. This requires the use of a more powerful and thus more expensive driving motor and usually also an inverter controlling the motor, possibly with a lower efficiency, than otherwise required for the process.

The Purpose and Solution of the Invention

The present invention provides a solution for the above problems. An efficient solution has been developed, which keeps the production streams per drop chute substantially unchanged by means of simple solutions that are operative in operational conditions.

The invention relates to a method and an apparatus, where the thickness reduction of the precoat for a disc filter comprising two or more filter discs is not performed simultaneously for all filtering surfaces of all discs, but the thickness reduction is performed only for some of them so that the changes in filtered material streams per filter and drop chute are substantially decreased. More precisely, the solution according to the present invention is characterized in what is presented in the independent claims.

In the arrangement according to the invention, the thickness of the precoat is reduced so that it is performed by a scraper located on one side of the drop chute only, which compensates the amount of lime sludge entering the drop chutes, thus reducing the risk of clogging. The implementation of the invention does not affect drop chutes located at both ends, through which flows product stream produced by one scraper only. Therefore the advantages of the invention become the clearer, the greater number of discs the filter has. Nevertheless, the alteration in the production flow as a whole is equalized, if the precoat thickness on the outer filtering surfaces of the filter discs at the ends are reduced non-simultaneously.

In the apparatus according to the most preferred embodiment of the invention, the scrapers are fixed stationary to the frame part of the filter, e.g. by means of screw joints, to a desired distance from the filter disc. When the center shaft common to the filter discs is moved in the direction of its longitudinal axis, the filter discs fixed to the shaft move closer to the tips of the scrapers located on the other side thereof. Thereby, a precoat layer of desired thickness is scraped off the surface of the cake on said side. Simultaneously, on the side of the filter disc where the distance to the scraper increases, the layer thickness to be scraped is decreased. This way, the material stream per drop chute remains as even as possible.

By moving the discs instead of the scrapers, cost savings can be obtained, since the complex moving mechanism inside the filter, with its numerous adjusted objects, can be completely omitted. This fact is a considerable advantage in view of maintainability of the apparatus.

Since the actuator producing the axial motion bear the axial load, the bearing of the central shaft can be implemented so that the radial bearings do not need to carry any axial force. This reduces the equivalent dimensioning strength used in dimensioning the bearings and provides the opportunity to use cheaper bearings. Further, the precoat thinning motions can be performed under good conditions by lubricated moving surfaces and by moving only one unit. The changes in the distances of all scrapers and filter discs can always be the same at the same sides of the filter discs, since there are no sticking linking mechanisms or hinges. Thus, the motions for reducing the precoat thickness can be performed with precisely controlled extent and velocity of the motions. Decelerated changes of distance of the scrapers and the filtering surfaces also assist in keeping the drop chute streams at both ends more even, which is difficult to achieve otherwise.

By keeping the precoat thinning motion slow and continuous, the production flow is as constant as possible both in view of amount and quality. Due to simpler moving mechanism, continuous or otherwise decelerated precoat thinning motion can be performed in accordance with the embodiment of the invention more reliably than before.

In another embodiment of the invention, the thickness reduction of the precoat is performed using hinged scrapers. The scrapers are connected to a rod that combines them. By pulling or pushing the rod, the blades of the scraper are moved in the same direction as the rod, whereby the scraper on one side of the disc moves closer to the filtering surface and the scraper on the other side moves further away from the disc, i.e. the situation is the same as when moving the discs only. This way, when a scraper is provided on both sides of the drop chute, the material stream in the chute remains substantially even. When the apparatus already is provided with this kind of hinged scrapers, the modification is easily performed and the moving mechanism is simpler and easier to maintain than in conventional technique, where both scrapers are moved simultaneously towards the filtering surfaces.

Reducing the thickness of the precoat on both sides of the drop chute non-simultaneously can be performed in accordance with the invention also with the present moving mechanisms of the scrapers which all are moved towards the filtering surfaces of a disc at the same time. Then the scrapers for e.g. every second discs are combined together via their actuators. Then the precoat thickness reduction can be performed obtaining almost similar process advantages. However, the process is more complicated than the present, since at least two actuators and linking mechanisms are required instead of one of both. The product stream increases by only half of what it is increased when performed in traditional way, which often is adequate as a less optimal solution for the mentioned problems.

The invention can be performed also so that the left-hand scrapers of the discs are connected to move simultaneously and the right-hand side ones simultaneously but both of them they are not necessarily moved simultaneously. Left hand scrapers may stay stationary as the right hand scrapers move. The tips of the scrapers may also move with different velocity to the same direction because the different sides are moved independently.

In any of the designs using moving scraper tips, the actuating linkages and actuators can be divided to serve only a portion of the discs simultaneously. This may be even necessary, if the amount of the discs is high, e.g. 8 or more discs.

Advantages of the method and apparatus according to the invention include e.g.:

The changes of production streams of the filter per drop chute, as well as the overall production stream are substantially reduced, the structure of the filter can be simplified, when reducing the thickness of the precoat, the power required for rotating the shaft of the filter discs does not substantially increase, less parts requiring maintenance inside the apparatus, the apparatus can be made shorter, the solution can be performed with existing apparatuses by modifying the moving mechanisms, the reduction of the thickness of the precoat can be performed in a more controlled way and the extent and velocity of the reduction can be varied, disturbances for downstream processes are decreased and the capacity of the drop chutes and the conveyors is not exceeded, which prevents clogging.

LIST OF DRAWINGS

Figure 2:
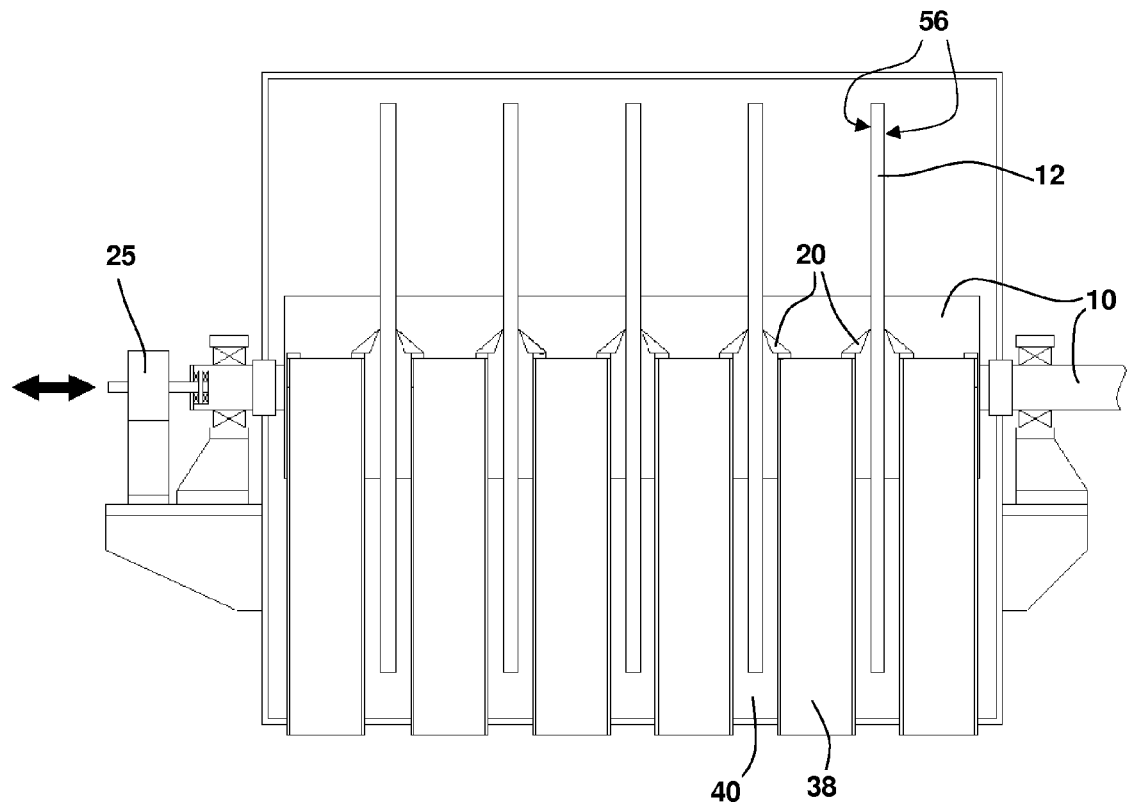

In the following, the invention is disclosed in more detail with reference to the appended drawings, of which FIG. 1 illustrates general features of a disc filter, FIG. 2 illustrates a solution according to an embodiment of the invention having a central shaft that moves in its axial direction, FIG. 3 illustrates the operation of the scrapers in connection with a solution according to an embodiment of the invention having a central shaft that moves in its axial direction and FIG. 4 illustrates the operation of the scrapers in connection with a solution according to an embodiment of the invention, where all scrapers are connected together.

DETAILED DESCRIPTION OF THE INVENTION

FIG. 1 illustrates general features of a filter disc used in lime sludge filtration in the chemical pulp industry.

The disc filter comprises a rotary shaft 10 that is hollow or otherwise provided with filtrate flow channels 16. The filter shaft 10 is supported at its ends and connected via bearings to the frame of the apparatus, in connection with which the drive devices are arranged. The shaft 10 is connected to drive devices (not shown), such as a motor, a reduction gear etc. A number of filter discs 12 are arranged on the shaft 10, which discs comprise sectors 14 having wire-coated filtering surfaces 56 on both sides. The filtrate coming from the sectors 14 is led out of the apparatus via flow channels 16, which may be combined to discharge into the hollow shaft 10.

In order to ensure functional operation of the filter, a pressure difference is created between the inner and outer sides of the filtering surfaces 56. Therefore the interior of the filter is pressurized e.g. by means of an air compressor to produce the pressure difference. Alternatively or in addition, pressure difference can be created or increased by means of a vacuum source connected to the flow channels 16 of the shaft 10. The pressure difference may be adjustable and it can be switched off e.g. by means of a valve.

The lower part of the filter discs 12 are submerged in lime sludge slurry fed into basin 40. The surface L1 of the slurry in the basin 40 extends to a level where it completely covers the sector 14 that is at the bottom dead center. As the filter disc 12 rotates in the basin 40, lime sludge is accumulated on the filtering surface 56 forming a cake, and the liquid filtrate passes through the filtering surface 56. At first, a precoat 57 (in FIG. 2) layer is thickened on the filtering surfaces 56 for assisting the filtration. After filtration, the cake may be washed, whereby the cake is flushed with washing liquid jets as displacement wash. Then the cake is dried, usually to be as dry as possible.

A scraper 20 is arranged on a declined level slightly above the slurry level L1 in the basin 40 on both sides of the filter disc 12. The distance between the scraper and the filtering surface 56 is usually adjustable. The scraper 20 is located in the vicinity of the slurry level L1 in order to maximize the drying period of the cake. The scraper 20 scrapes off filtered lime sludge layer on the filtering surface 56 or on the precoat 57 on the filtering surface. From over the scraper 20, the lime sludge layer flows into a drop chute 38 that is separated from the basin and located at the side of the disc 12. Lime sludge is accumulated in the drop chute 38 approximately to the height of level L2. The drop chute 38 may be provided with a mixer 22, which mixes the dried lime sludge with the liquid being fed into the drop chute, so that the lime sludge can flow in slurried form out of the apparatus via channel 24. High-volume momentary material streams can cause that the mixing and slurrying devices are not capable to slurry the whole stream, but dry sediment clogs the drop chute 38.

FIG. 2 illustrates a filter disc with five filter discs 12 in accordance with an embodiment of the invention provided with a shaft 10, which moves in its axial direction, and with stationary scrapers 20. Often there are more discs, e.g. eight. The shaft 10 of the apparatus is supported on bearings so that it can be moved in the axial direction of the shaft. The moving of the shaft 10 in the axial direction can be performed by means of several different arrangements. The operational principle of the actuator 25 used for the moving can be mechanical, pneumatic, hydraulic or electrical. Also many types of linkages and bearings can be used for transmitting the required axial force and the moving motion to the shaft 10. The actuator 25 can be mounted to either end of the shaft, depending on other limitations.

The shaft 10 is directed to desired positions e.g. by means of stationary of movable stoppers arranged in the actuator 25 of the shaft. The velocity of its moving can be limited e.g. by means of a restricting valve in the hydraulic or pneumatic system. The axial position of the shaft 10 can also be monitored by means of electrical equipment defining the moving velocity, location or distance. Based on this measurement data, the actuator 25 can be controlled to move the shaft 10 to a desired position and at a desired velocity, which allows varying the depth and velocity of the scrapers 20 penetration into the precoat 57. Corresponding controlled actuators 25 and motion controlling means can be used also in other embodiments.

When the length of motion can be altered, the thickness of the precoat 57 can periodically be reduced thinner than normally, whereby it is possible to lengthen the removal period, as more than usual of the clogged layer is removed. Further, scraping deeper can assist the removal and replacement of the precoat 57, when it is made as thin as possible before the removal. The scraper 20 cannot be moved to touch the filtering surface 56, because that would lead to breakage of the filter.

Figure 3A:
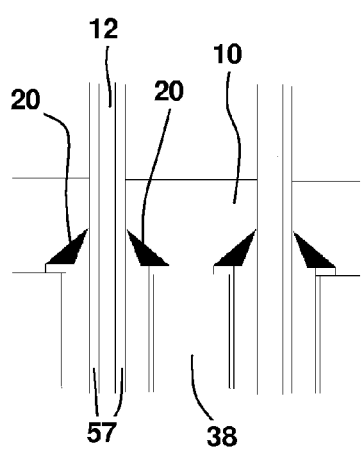
Figure 3B:
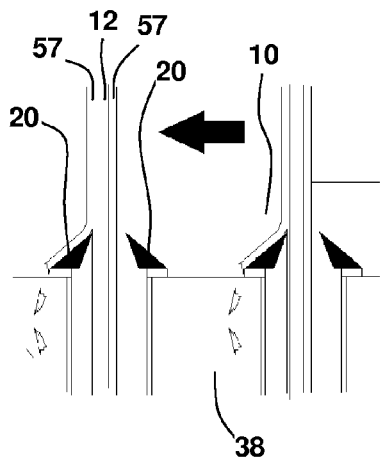
Figure 3C:
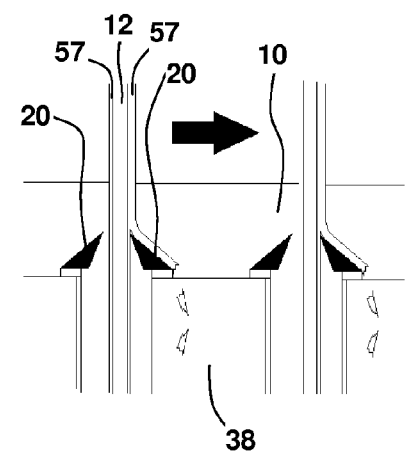

FIGS. 3a, 3b and 3c illustrate the reduction of precoat 57 stepwise on both sides of the filter disc 12. In FIG. 3a the filter disc 12 is located symmetrically between the scrapers 20, whereby normal filtration and scraping of the cake into the drop chute 38 is performed. In FIG. 3b the shaft with filter discs 12 is moved to the left, whereby from the left-hand surface of the filter disc 12 a thicker layer is scraped off than from the right-hand side, and thus the thickness reduction of the precoat 57 is performed from one side of all filter discs 12. The mutual distance of the tips of all scrapers 20 on different sides of the filter disc may remain unchanged. Since the distance of both of these scrapers 20 to the filtering surface 56 changes equal amount, the material stream per drop chute 38 that is scraped off can remain unchanged all the time. If the precoat 57 thickness reduction is performed quickly by moving the shaft 10 more than the normal layer thickness to be scraped off, the material stream increases, but this increase is always substantially smaller than when carried out in a traditional way by effecting the thickness reduction of the precoat 57 on both sides of the drop chute 38 simultaneously.

When the precoat reduction has been performed on one side of the filter discs 12, the situation of FIG. 3c is performed immediately. The shaft 10 is moved with its filter discs 12 to the right-hand side and the thickness reduction is performed for the precoat 57 of the right-hand side of the filter discs. If there is no pause and the motion is performed quickly, the material stream in the drop chute remains substantially the same as when reducing the thickness of the precoat 57 of the first side.

After the precoat 57 thickness reduction has been performed on both sides of the disks 12, the material stream may cease for a while, until the material cake on the filter discs has increased. This does not necessarily cause any harm, since the drop chute 38 has time to empty to its normal level L2. The breakage in the material stream can be decreased by returning after the first side has been treated the shaft back to its basic position and by keeping a pause before the thickness reduction of the second side. Also performing the thickness reduction using decelerated motions even to both feed and backwards directions can equalize the material stream and prevent considerably changes or interruptions.

OTHER EMBODIMENTS OF THE INVENTION

Figure 4A:
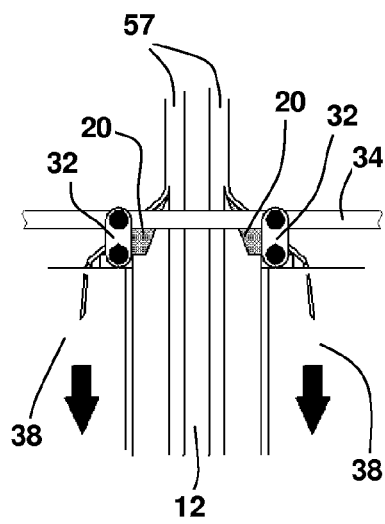
Figure 4B:
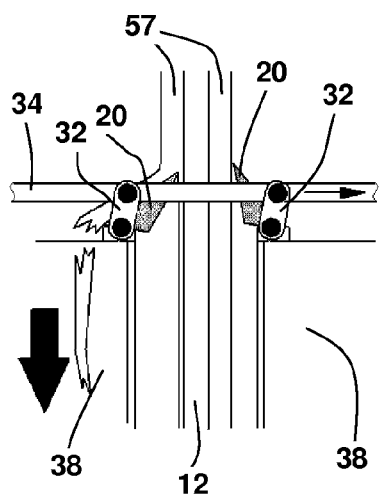
Figure 4C:
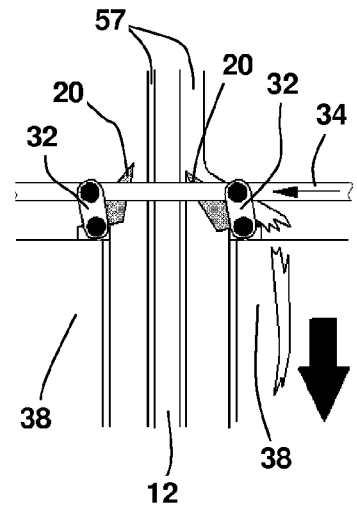

FIGS. 4a, 4b and 4c illustrate an arrangement according to the invention, where the above described scraping is performed using an apparatus having a shaft 10 and its filter discs 12 that are stationary in the axial direction. The scrapers 20 are hinged to the filter frame and connected to each other via a linking member 34, such as a rod or a beam, and levers 32 transmitting the motion. The moving of the tips of the scrapers 20 is performed so that when they are moved, the distance of the scraper 20 on the left side of the filter disc 20 to the filtering surface 56 increases or decreases always in the opposite way and approximately as much as the distance of the right side scraper 20 to the filtering surface 56.

In FIG. 4a the filter disc 12 is located symmetrically between the scrapers 20, whereby normal filtration and scraping of the cake into the drop chute 38 is performed. In FIG. 4b the linking member 34 connecting the scrapers 20 via the levers 32 is moved to the right, whereby a thicker layer is scraped off from the precoat 57 on the left-hand side of the filter disc 12, and thus the thickness of the precoat 57 will be reduced from the left side. Since the mutual distance of both scrapers 20 remains substantially unchanged, the influence on the material stream per drop chute 38 is similar to that in an embodiment using a longitudinally moving shaft 10.

When the thickness reduction has been completed on the first side, the situation of FIG. 4c is performed. The connection member 34 connecting the scrapers 20 is moved to the left and the thickness reduction of the precoat 57 of the second side of the filter disc 12 is performed.

When the motions of all scrapers 20 are parallel the way described above, the components 32, 34 transmitting the motion are simpler than in case of scrapers 20 moving to opposing directions. Then it is also easier to control the length and velocity of the motions of the scrapers 20 independent on the conditions. Simpler moving elements are also easier to protect against the process conditions.

Reduction of the thickness of the precoat 57 non-simultaneously from the filtering surfaces 56 adjacent the drop chute 38 can be performed by existing moving mechanisms of the scrapers 20, which perform the thickness reduction on both sides of a filter disc 12 simultaneously. In the method, the thickness reduction will not be performed to two adjacent filter discs (12) simultaneously. In the embodiment of the invention, the scrapers 20 of e.g. every second disc 12 are connected to one common actuator 25 and these precoat 57 thinning motions are performed with both actuators 25 non-simultaneously. Then the precoat 57 thickness reduction can be performed obtaining the process advantages of the invention. An additional advantage is that the filter disc 12 is loaded with symmetrical scraping forces. The mechanism is more complicated though, since two actuators 25 are needed for moving the scrapers 20. Also the opposing motions of the scrapers 20 on different sides of the disc 12 require more complicated linkages than when the tips of the scrapers 20 are always moved to the same direction.

The invention can be performed also so that the left-hand scrapers 20 of the discs 12 are connected to move simultaneously to the same direction and the right-hand side ones correspondingly together simultaneously to the same direction. The actuators 25 of these are controlled to move the tips of the scrapers 20 on the side in question either non-simultaneously or so that they move in the direction of the longitudinal axis of the filter simultaneously to the same direction, as in FIGS. 4a, 4b and 4c.

Although the above description relates to embodiments of the invention that in the light of present knowledge are considered the most preferable, it is obvious to a person skilled in the art that the invention can be modified in many different ways within the broadest possible scope defined by the appended claims alone.

The invention claimed is:

1. A method for reducing the thickness of a precoat-layer accumulated on a filtering surface of a filter disk, comprising:
   accumulating at least one precoat-layer on at least one filtering surface of one or more filter discs that is partly or fully submerged in a solids-containing suspension in a basin of a disc filter, the disc filter having two or more filter discs arranged on a shaft;
   providing at least one drop chute between at least one pair of the filter discs, and a scraper on either side of the filter discs;
   scraping at least a portion of the precoat-layer on the filtering surfaces of the filter discs into the drop chute;
   reducing the precoat-layer thickness on the filtering surfaces by shortening distances between tips of the scrapers and the adjacent filtering surfaces;
   wherein the precoat-layer thickness is reduced non-simultaneously on precoat-layers accumulated on the filtering surfaces of two filter discs situated on both sides of a drop chute.

2. The method of claim 1, wherein the distances between the tips of the scrapers on two different sides of the filtering disc remain substantially unchanged during the precoat-layer thickness reduction.

3. The method of claim 1, wherein the distances between the scrapers and the filtering surfaces on filtering discs are reduced by moving the shaft in an axial direction of the shaft.

4. The method of claim 1, wherein the distances between the scrapers and the filtering surfaces on filtering discs are reduced by moving a linking member connected to the scrapers that are hinged to a filter frame, the linking member moves the tips of the scrapers in an axial direction of the shaft simultaneously towards the same direction.

5. The method of claim 1, wherein the precoat-layer thickness is reduced on both sides of a filter disc simultaneously, and the thickness is reduced on two adjacent filter discs non-simultaneously.

6. The method of claim 1, wherein the distances between the scrapers and the filtering surfaces on filtering discs are reduced at decelerated velocity and/or that a pause is kept between the thickness reductions performed on the two precoat-layers on the two filtering surfaces adjacent to the drop chute.

7. The method of claim 3, wherein the distances between the scrapers and the filtering surfaces on filtering discs are reduced at decelerated velocity and/or a pause is kept between the thickness reductions which are performed on the two precoat-layers on the two filtering surfaces adjacent to the drop chute.

8. The method of claim 1, wherein the distances between the scrapers and the filtering surfaces on filtering discs are reduced without a pause therebetween.

9. A disc filter comprising:
   a filter shaft supported on bearings of a filter frame;
   two or more filter discs arranged on the filter shaft, the filter discs are partially inside a basin, having filter surfaces on opposite faces of the filter discs;
   at least one drop chute situated between the filter discs;
   at least one scraper provided on both sides of the drop chute adjacent to the filter discs, the scrapers are connected to the filter frame to scrape suspension accumulated on the filter surfaces;
   wherein the filter discs are provided with one or more actuators arranged for moving the shaft or the scrapers to reduce a distance between the scrapers and the filtering surfaces such that the distances between two scrapers and corresponding filtering surfaces adjacent a drop chute are reduced non-simultaneously.

10. The disc filter of claim 9, wherein the distances between tips of the scrapers on two different sides of the filter disc are arranged to remain substantially constant when the scrapers or the shaft are moved by the actuators.

11. The disc filter of claim 9, wherein the distance between the scrapers and the filtering surfaces are reduced by moving a linking member connected to the scrapers that are hinged to the filter frame, the linking member moves the tips of the scrapers in an axial direction of the shaft simultaneously to the same direction.

12. The disc filter of claim 9, wherein the distance between the scrapers and the filtering surfaces are reduced on both sides of a filter disc simultaneously.

13. The disc filter of claim 9, wherein the distances between the left-hand scrapers and the right-hand scrapers and the corresponding adjacent filtering surfaces on either side of a drop chute change non-simultaneously or change with different velocity.

14. The disc filter of claim 9, wherein the actuators are mechanical, pneumatic, hydraulic or electrical.

\* \* \* \* \*